US012752763B2

(12) United States Patent
Betts et al.

(10) Patent No.: US 12,752,763 B2
(45) Date of Patent: Oct. 6, 2026

(54) WARPED ROTOR DETECTION

(71) Applicant: Rivian IP Holdings, LLC, Plymouth, MI (US)

(72) Inventors: Matthew Robert Betts, Clarkston, MI (US); Daniel Ross Flora, West Bloomfield, MI (US); Kevin Jared Sallee, Lake Forest, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 737 days.

(21) Appl. No.: 18/128,439

(22) Filed: Mar. 30, 2023

(65) Prior Publication Data

US 2024/0326770 A1 Oct. 3, 2024

(51) Int. Cl.

| | |
|---|---|
| ***B60T 17/22*** | (2006.01) |
| ***B60Q 9/00*** | (2006.01) |
| ***B60T 13/74*** | (2006.01) |
| ***F16D 66/00*** | (2006.01) |
| *F16D 65/18* | (2006.01) |
| *F16D 121/20* | (2012.01) |
| *F16D 121/24* | (2012.01) |
| *F16D 125/34* | (2012.01) |

(52) U.S. Cl.

CPC ................ *B60T 17/22* (2013.01); *B60Q 9/00* (2013.01); *B60T 13/746* (2013.01); *F16D 66/00* (2013.01); *F16D 65/18* (2013.01); *F16D 2066/006* (2013.01); *F16D 2121/20* (2013.01); *F16D 2121/24* (2013.01); *F16D 2125/34* (2013.01)

(58) Field of Classification Search

CPC ...... B60T 17/22; B60T 13/746; B60T 17/221; B60Q 9/00; F16D 65/18; F16D 66/00; F16D 2066/006; F16D 2121/20; F16D 2121/24; F16D 2125/34

See application file for complete search history.

(56) References Cited

U.S. PATENT DOCUMENTS

| | | | | |
|---|---|---|---|---|
| 7,695,075 | B1 * | 4/2010 | Mackiewicz | B60T 8/173 303/191 |
| 10,703,351 | B2 * | 7/2020 | Pursifull | B60T 17/221 |
| 11,174,910 | B2 * | 11/2021 | Kane | G01B 5/0028 |
| 11,220,251 | B2 * | 1/2022 | Du | B60T 17/226 |
| 12,227,157 | B2 * | 2/2025 | Korte | B60T 7/085 |
| 12,459,482 | B2 * | 11/2025 | Chelaidite | B60T 17/22 |
| 2019/0367002 | A1 * | 12/2019 | Pursifull | B60T 8/885 |
| 2019/0389446 | A1 * | 12/2019 | Du | B60T 17/226 |
| 2021/0088094 | A1 * | 3/2021 | Kane | B60T 17/22 |
| 2023/0228310 | A1 * | 7/2023 | Toy | F16D 66/021 188/1.11 W |
| 2024/0391446 | A1 * | 11/2024 | Chelaidite | B60T 17/22 |
| 2025/0189004 | A1 * | 6/2025 | Putz | F16D 65/38 |

* cited by examiner

*Primary Examiner* — Thomas W Irvin

(74) *Attorney, Agent, or Firm* — HG Law LLP

(57) ABSTRACT

Systems and methods for determining if a brake rotor in an electromechanical braking system is warped are disclosed herein. An electronic actuator of a brake caliper is controlled to apply a force to a brake pad towards the brake rotor. While controlling the electronic actuator to apply the force, an operating parameter of the electronic actuator is monitored. A determination of whether the brake rotor is warped is made based on the operating parameter.

20 Claims, 5 Drawing Sheets

WARPED ROTOR DETECTION

INTRODUCTION

This disclosure is directed to an electromechanical braking system, and more particularly, to an electromechanical braking system that is able to determine whether a brake rotor is warped during normal operation of a vehicle.

SUMMARY

A warped brake rotor in a braking system of a vehicle may reduce braking power and cause vibration in the vehicle. However, as a number of different vehicle issues may reduce braking power or cause vehicle vibration, it may be difficult to determine if a brake rotor is warped without inspecting the brake rotor during manual servicing (e.g., using external measurement systems and diagnostic tools).

The present disclosure provides systems and methods for determining whether a brake rotor of an electromechanical braking system is warped during normal operation of a vehicle. Electromechanical braking systems (e.g., electric brake-by-wire systems) use an electronic actuator (instead of, e.g., a hydraulic actuator) to apply a force to a brake pad towards a brake rotor. Brake rotor warp may be due to a variety of potential causes (e.g., overheating). The term "warped" refers to a brake rotor that is no longer flat. Applying braking to a warped rotor causes vibration as the brake pads skip along the varying brake rotor surface. That is, the distance between the electronic actuator and the brake rotor surface varies as the brake rotor rotates. The electromechanical braking system may determine whether a brake rotor is warped by monitoring, during braking, at least one operating parameter of an electronic actuator (e.g., motor feedback current). This enables a warped brake rotor to be quickly identified without requiring, for example, manual servicing.

An electromechanical braking system is provided. The system includes a brake caliper including an electronic actuator, and control circuitry. The control circuitry is configured to control the electronic actuator to apply a force to a brake pad towards a brake rotor; monitor, while controlling the electronic actuator to apply the force, an operating parameter of the electronic actuator; and determine whether the brake rotor is warped based on the operating parameter.

In some embodiments, the electronic actuator may include an electric motor, and the operating parameter may include a current of the electric motor.

In some embodiments, the electronic actuator may include an electric motor, the electric motor may be coupled to the brake pad through a mechanical linear actuator, and the operating parameter may include a current of the electric motor.

In some embodiments, the electronic actuator may include a variable force solenoid, and the operating parameter may include at least one of a back voltage of the variable force solenoid or a current of the variable force solenoid.

In some embodiments, the control circuitry may be configured to determine whether the brake rotor is warped based on a variation in the operating parameter.

In some embodiments, the control circuitry may be configured to determine whether the brake rotor is warped by determining whether the operating parameter changes more than a threshold amount within a time period, and in response to determining that the operating parameter changes more than the threshold amount within the time period, determining that the brake rotor is warped.

In some embodiments, the control circuitry may be further configured to generate a notification that the brake rotor is warped, in response to determining that the brake rotor is warped.

In some embodiments, the control circuitry may be configured to determine whether the brake rotor is warped by determining a rotational speed of the brake rotor, and in response to determining that the rotational speed is above a threshold speed, determining whether the brake rotor is warped.

In some embodiments, the control circuitry may be configured to determine whether the brake rotor is warped by determining a buffer time period after controlling the electronic actuator to apply the force to the brake pad, and determining whether the brake rotor is warped based on the monitored operating parameter after the buffer time period.

In some embodiments, the control circuitry is configured to determine the buffer time period based on at least one of a rotational speed of the brake rotor, a time since last controlling the electronic actuator to apply a force, or a turn-on resistance of the electronic actuator.

In some embodiments, a method for determining whether a brake rotor is warped is provided. The method includes controlling an electronic actuator of a brake caliper to apply a force to a brake pad towards a brake rotor; monitoring, while controlling the electronic actuator to apply the force, an operating parameter of the electronic actuator; and determining whether the brake rotor is warped based on the operating parameter.

In some embodiments, the electronic actuator may include an electric motor, the electric motor may be coupled to the brake pad through a mechanical linear actuator, and the operating parameter may include a current of the electric motor.

In some embodiments, the electronic actuator may include a variable force solenoid, and the operating parameter may include at least one of a back voltage of the variable force solenoid or a current of the variable force solenoid.

In some embodiments, determining whether the brake rotor is warped is based on a variation in the operating parameter.

In some embodiments, determining whether the brake rotor is warped may include determining whether the operating parameter changes more than a threshold amount within a time period, and in response to determining that the operating parameter changes more than the threshold amount within the time period, determining that the brake rotor is warped.

In some embodiments, the method may further include generating a notification that the brake rotor is warped, in response to determining that the brake rotor is warped.

In some embodiments, determining whether the brake rotor is warped may include determining a rotational speed of the brake rotor, and in response to determining that the rotational speed is above a threshold speed, determining whether the brake rotor is warped.

In some embodiments, a vehicle is provided that includes a brake rotor, a brake caliper including an electronic actuator, and control circuitry. The control circuitry is configured to control the electronic actuator to apply a force to a brake pad towards the brake rotor, monitor, while controlling the electronic actuator to apply the force, an operating parameter of the electronic actuator; and determine whether the brake rotor is warped based on the operating parameter.

In some embodiments, the control circuitry may be configured to determine whether the brake rotor is warped by determining whether the operating parameter changes more than a threshold amount within a time period, and in response to determining that the operating parameter changes more than the threshold amount within the time period, determining that the brake rotor is warped.

In some embodiments, the control circuitry is configured to filter the operating parameter based on at least one of a rotational speed of the brake rotor, a time since last controlling the electronic actuator to apply a force, or a turn-on resistance of the electronic actuator.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
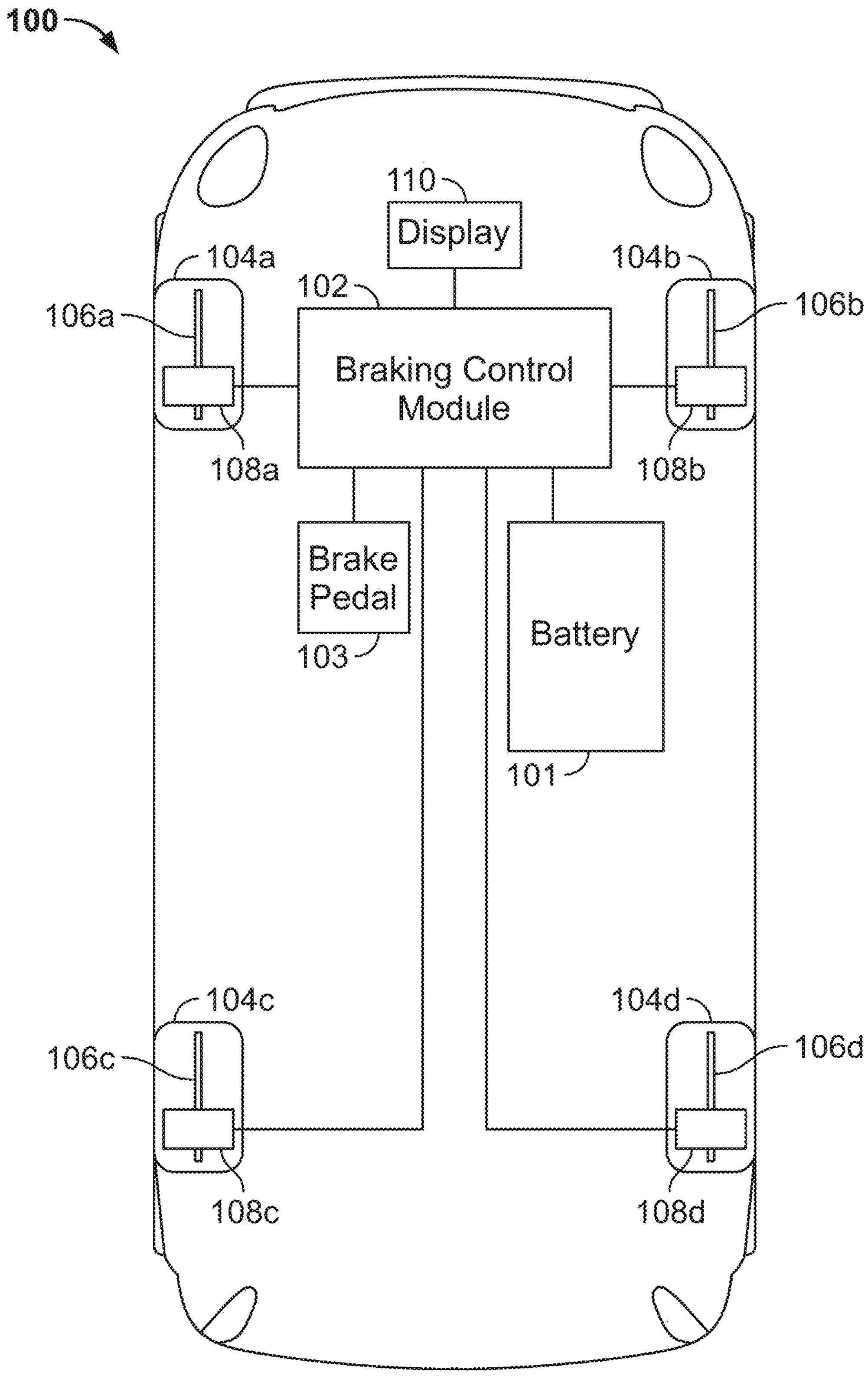
FIG. 1 shows a top view of a vehicle including a braking system, in accordance with some embodiments of the present disclosure.

FIG. 1 shows a top view of a vehicle 100 including a braking system, in accordance with some embodiments of the present disclosure. The vehicle 100 may be a car (e.g., a coupe, a sedan, a truck, an SUV, a bus), a motorcycle, or any other type of vehicle with a braking system. In some embodiments, as explained in further detail below, the braking system may be an electromechanical braking system (e.g., using an electronic actuator instead of a hydraulic actuator).

As shown, the vehicle 100 includes a left front wheel 104*a*, a right front wheel 104*b*, a left rear wheel 104*c*, and a right rear wheel 104*d* (collectively referred to as wheels 104). However, this is only one example, and the vehicle 100 may include any suitable number of wheels (e.g., a two-wheeled motorcycle). In some embodiments, each of the wheels 104 may include a brake rotor (106*a*, 106*b*, 106*c*, 106*d*, collectively referred to as brake rotors 106) and brake caliper (108*a*, 108*b*, 108*c*, 108*d*, collectively referred to as brake calipers 108). In some embodiments, only the front wheels 104*a* and 104*b* may include a brake rotor and brake caliper. As shown, the vehicle 100 may include a braking control module 102 configured to control the brake calipers 108 to slow the vehicle 100 based on an input from brake pedal 103 and perform the functions discussed herein. The vehicle 100 may include a battery 101 for providing power to the vehicle 100 and to the braking system and a display 110 (e.g., for displaying notifications to a driver). It should be appreciated that FIG. 1 only shows some of the components of the vehicle 100, and it will be understood that the vehicle 100 also includes other elements commonly found in vehicles, e.g., a motor, wheel controls, autonomous driving components, etc.

Figure 2:
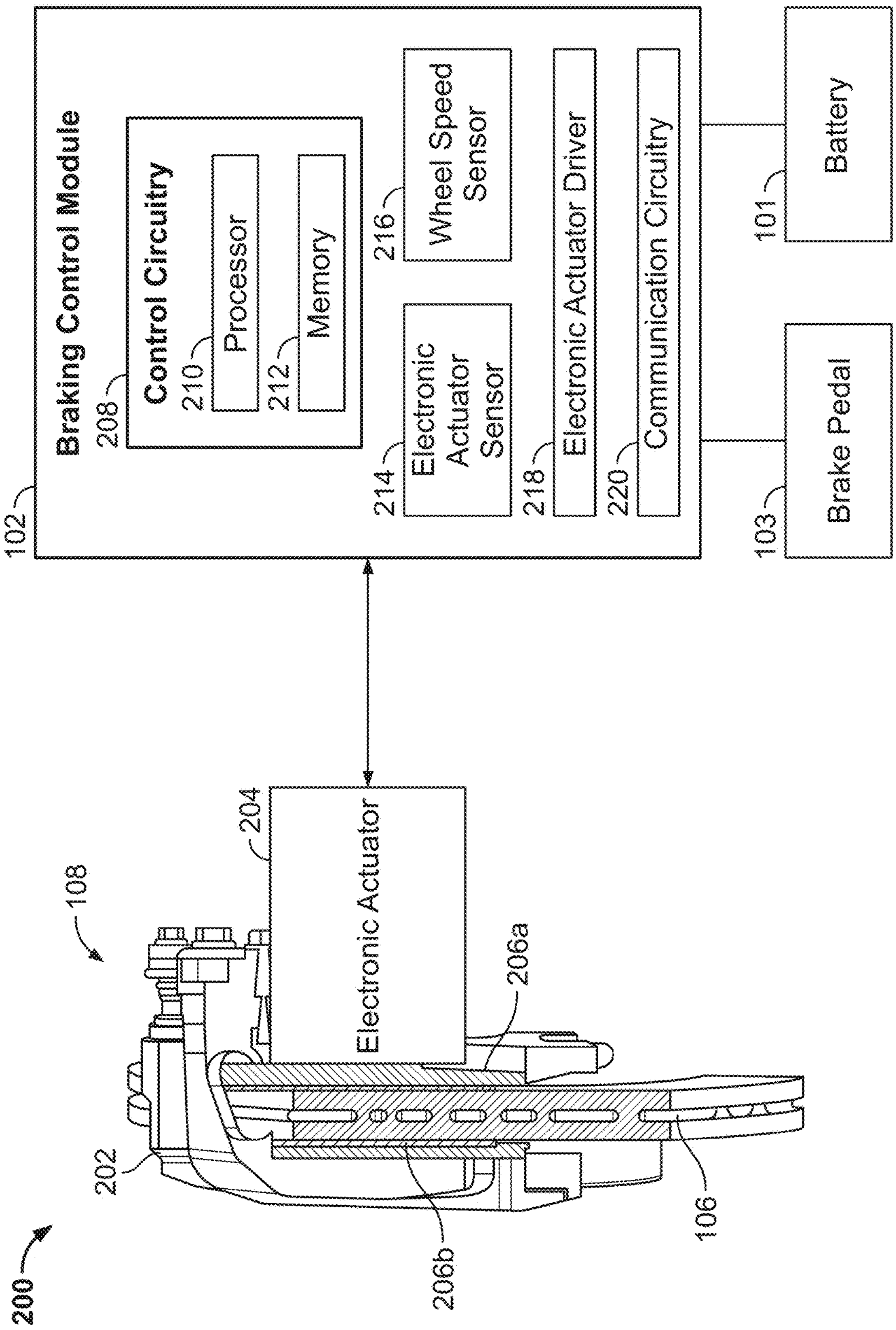
FIG. 2 shows an illustrative block diagram of an electromechanical braking system, in accordance with some embodiments of the present disclosure.

FIG. 2 shows an illustrative block diagram of an electromechanical braking system 200, in accordance with some embodiments of the present disclosure. The electromechanical braking system 200 may be implemented in the vehicle 100 of FIG. 1. For example, the illustrated brake caliper 108 is a detailed view of any of the brake calipers 108 illustrated in FIG. 1. As shown, the brake caliper 108 may be an electronic brake caliper having a caliper body 202 and an electronic actuator 204. That is, the brake caliper 108 may use electronic actuator 204 (e.g., instead of a hydraulic actuator) to generate a clamping force between the brake pads 206*a*, 206*b* (collectively referred to as brake pads 206) and the brake rotor 106 (e.g., to provide a stopping force). Although only a single electronic actuator is shown, it should be understood that the brake caliper 108 may include a plurality of electronic actuators (e.g., one on each side of the brake rotor 106). As explained in further detail with reference to FIGS. 3 and 4, the electronic actuator 204 may comprise any suitable electric motor (e.g., a brushless DC motor), solenoid (e.g., variable force solenoid), or electromechanical device to generate the desired clamping force.

In some embodiments, the braking control module 102 includes control circuitry 208, which may comprise a processor 210 and memory 212. The processor 210 may comprise a hardware processor, a software processor (e.g., a processor emulated using a virtual machine), or any combination thereof. The memory 212 may comprise hardware elements for non-transitory storage of commands or instructions, that, when executed by the processor 210, cause the processor 210 to operate the electromechanical braking system 200 (e.g., provide braking and determine brake rotor warpage), in accordance with embodiments described above and below. In some embodiments, the memory 212 may be used to store various types of instructions, rules, and/or other types of data. For example, the memory may store threshold values for determining whether or not a brake rotor is warped. In some embodiments, the processor 210 executes instructions for an application (e.g., a brake rotor diagnostic application) stored in the memory 212. Specifically, the control circuitry 208 may be instructed by the application to perform the functions discussed herein. In some embodiments, any action performed by the control circuitry 208 may be based on instructions received from the application. For example, the application may be implemented as software or a set of executable instructions that may be stored in the memory 212 and executed by the processor 210. The control circuitry 208 may be communicatively connected to components of vehicle 100 via one or more wires, or via wireless connection.

As shown, the braking control module 102 may further include an electronic actuator sensor 214, a wheel speed sensor 216, an electronic actuator driver 218, and communication circuitry 220. In some embodiments, one or more of the electronic actuator sensor 214, the wheel speed sensor 216, and the electronic actuator driver 218 may be mounted at the caliper 108. The electronic actuator sensor 214 may include one or more sensors (e.g., a current sensor, a voltage sensor, a temperature sensor) for monitoring at least one parameter of the electronic actuator 204 for controlling the electronic actuator 204, depending on the type of electronic actuator 204. For example, if the electronic actuator 204 comprises an electric motor, the electronic actuator sensor 214 may comprise a current sensor for monitoring the current of the electric motor. If the electronic actuator 204 comprises a variable force solenoid, the electronic actuator sensor 214 may comprise at least one of a voltage sensor for monitoring the voltage (e.g., a back electromotive force (EMF) voltage) of the variable force solenoid and a current sensor for monitoring the current of the variable force solenoid. The wheel speed sensor 216 may monitor a wheel speed (e.g., brake rotor speed) of one or more of the wheels 104. The communication circuitry 220 may be in communication with one or more servers and may be configured to provide information (e.g., brake warpage notifications) to, e.g., a vehicle fleet manager.

The control circuitry 208 may control the electronic actuator driver 218 to drive the electronic actuator 204 to generate a desired clamping force between the brake pads 206*a*, 206*b* and the brake rotor 106 based on input at the brake pedal 103 (e.g., by the driver of the vehicle 100) or any other automatic braking control (e.g., while operating in an autonomous driving mode). The electronic actuator driver 218 may include suitable hardware for providing power to the electronic actuator 204 from the battery 101, based on the type of electronic actuator 204 (e.g., a power converter or a power inverter), to achieve a desired deceleration. For example, the control circuitry 208 may determine the position of the brake pedal 103, generate a deceleration request based on the determined position, and translate the deceleration request to a brake torque request. Based on the brake torque request, the electronic actuator driver 218 may control the electronic actuator 204 to achieve the desired deceleration. By monitoring at least one parameter of the electronic actuator 204 during braking (e.g., by the electronic actuator sensor 214), control circuitry 208 may determine if the brake rotor 106 is warped. For example, if the brake rotor 106 is warped, the resulting lateral induced motion (e.g., due to surface deviation) of the rotating brake rotor 106 against the brake pads 206 will induce a feedback current (or back EMF voltage) in the electronic actuator 204. By monitoring at least one parameter of the electronic actuator (e.g., current or voltage), the amount of warpage of the brake rotor 106 may be determined, as explained in greater detail below.

Figure 3:
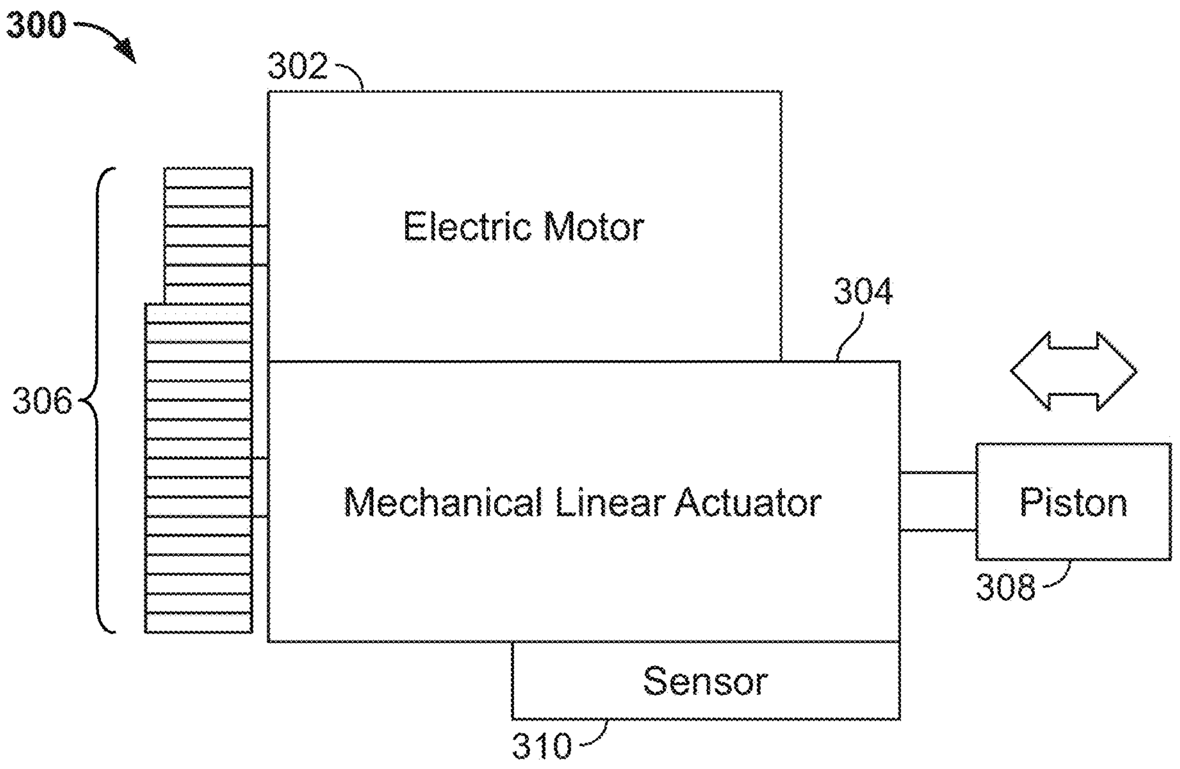
FIG. 3 shows an illustrative block diagram of a linear actuator, in accordance with some embodiments of the present disclosure.

FIG. 3 shows an illustrative block diagram of a linear actuator 300, in accordance with some embodiments of the present disclosure. In some embodiments, the electronic actuator 204 of FIG. 2 may comprise the linear actuator 300. As shown, the linear actuator 300 includes an electric motor 302 coupled to a mechanical linear actuator 304 by a gear set 306. That is, the linear actuator 300 may be an electronic actuator comprising an electric motor (e.g., an electromechanical actuator). In some embodiments, the electric motor 302 is a brushless direct current (DC) motor. However, this is only one example, and any suitable electric motor may be used (e.g., stepper motor, inductor motor, etc.). The braking control module 102 of FIG. 2 may drive the electric motor 302 to move piston 308 towards (or away from) the brake pad 206*a* to achieve the desired deceleration. For example, the mechanical linear actuator 304 may convert the rotational motion of the electric motor 302 into linear motion using any suitable linkage (e.g., a ball screw). The electronic actuator sensor 214 of FIG. 2 may comprise at least a current sensor to monitor the current of the electric motor 302 (e.g., for controlling the electric motor 302 and for determining brake rotor warpage). In some embodiments, the electronic actuator sensor 214 may also include a voltage sensor, a temperature sensor, or any other suitable sensor for driving the electric motor 302. In some embodiments, the linear actuator 300 may include a sensor 310 for monitoring position information of the mechanical linear actuator 304 (i.e., position information of the piston 308). The sensor 310 may include any suitable sensor (e.g., electrical/optical sensor) for independently determining the position of the mechanical linear actuator 304. Although one example of a linear actuator is shown, it should be understood that any suitable linear actuator may be used.

Figure 4:
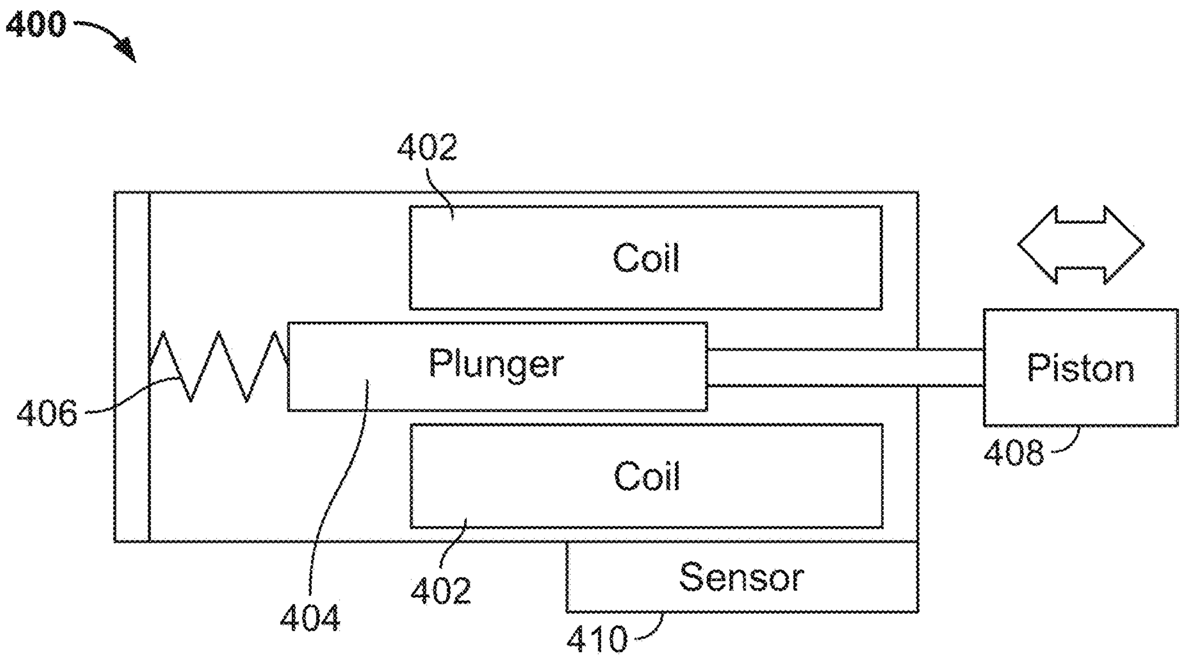
FIG. 4 shows an illustrative block diagram of a variable force solenoid, in accordance with some embodiments of the present disclosure.

FIG. 4 shows an illustrative block diagram of a variable force solenoid 400, in accordance with some embodiments of the present disclosure. In some embodiments, the electronic actuator 204 of FIG. 2 may comprise the variable force solenoid 400. As shown, the variable force solenoid 400 includes coil 402 surrounding a plunger 404 (e.g., an armature). The braking control module 102 of FIG. 2 may drive the variable force solenoid 400 to move piston 408 towards the brake pad 206*a* (e.g., the magnetic field and electrical current forms around the coil 402 and causes the plunger 404 towards the brake pad 206*a*). For example, the braking control module 102 may use voltage for stroke control and current for force control (e.g., to achieve a desired deceleration). In some embodiments, the variable force solenoid 400 may include a spring 406 to bias the piston 408 away from the brake pad 206*a*. The electronic actuator sensor 214 of FIG. 2 may include a voltage sensor to sense a back voltage of the variable force solenoid 400. In some embodiments, the electronic actuator sensor 214 of FIG. 2 may include at least one voltage sensor to monitor the voltage (e.g., back EMF voltage) of the variable force solenoid 400 and at least a current sensor to monitor the current of the variable force solenoid 400. In some embodiments, the electronic actuator sensor 214 may also include a voltage sensor, a temperature sensor, or any other suitable sensor for driving the electric motor 302. In some embodiments, the variable force solenoid 400 may include a sensor 410 for monitoring position information of the variable force solenoid 400 (i.e., position information of the piston 408). The sensor 410 may include any suitable sensor (e.g., electrical/optical sensor) for independently determining the position of the variable force solenoid 400. Although one example of a variable force solenoid is shown, it should be understood that any variable force solenoid may be used.

Figure 5:
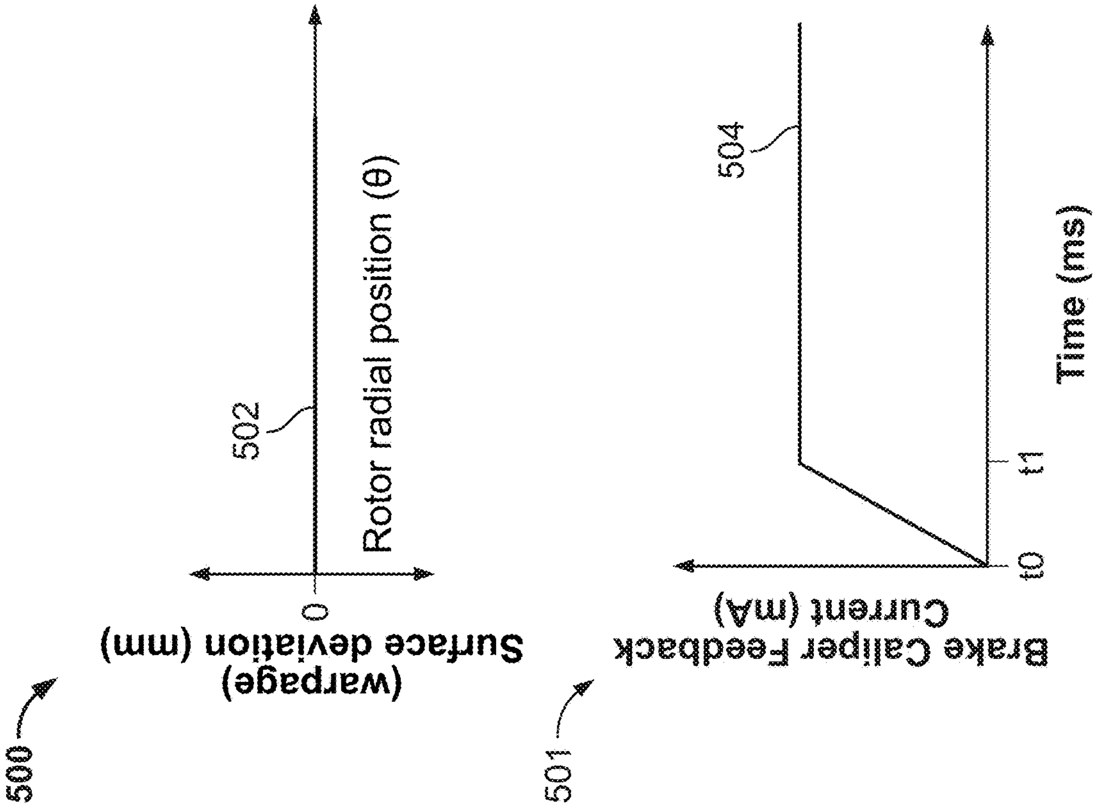
FIG. 5 shows example waveforms during a brake rotor diagnostic process when a brake rotor is not warped, in accordance with some embodiments of the present disclosure.

FIG. 5 shows example waveforms during a brake rotor diagnostic process when a brake rotor is not warped, in accordance with some embodiments of the present disclosure. As shown in waveform 500, when a brake rotor (e.g., the brake rotor 106) is not warped, surface deviation 502 (e.g., with respect to the brake pads 206) does not vary as the brake rotor spins. That is, the brake rotor does not generate any lateral-induced motion during rotation that would induce a feedback current in the electronic actuator. Thus, as shown in waveform 501, during constant braking, a determined operating parameter of the electronic actuator (e.g., the electronic actuator 204) will also be constant. For example, if the electronic actuator comprises an electric motor (e.g., the electric motor 302 of FIG. 3), a feedback current 504 of the electric motor will be constant (e.g., after an initial turn-on time from time $t_0$-$t_1$) during constant braking. That is, the feedback current 504 of the electric motor will correspond to the driving current of the electric motor (e.g., based on the desired braking power).

Although constant braking is illustrated and described, it should be understood that the brake rotor diagnostic process may be performed when braking is not constant. For example, although, as the brake pedal is adjusted, the feedback current may vary, this feedback current may be filtered out to determine the variation of the feedback current due to brake rotor warpage and not based on brake pedal input. Additionally, although only a feedback current is shown, it should be understood that other feedback operating parameters may behave similarly. For example, back EMF voltage of a variable force solenoid will be constant during constant braking if the brake rotor is not warped.

Figure 6:
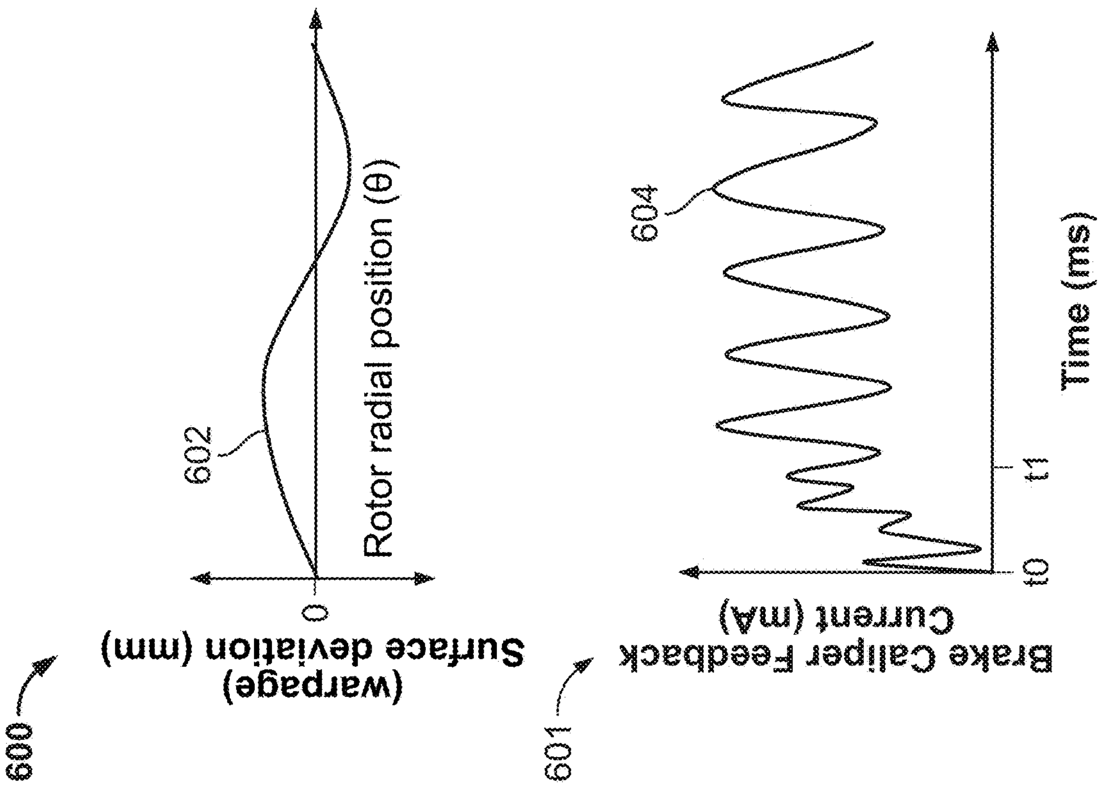
FIG. 6 shows example waveforms during a brake rotor diagnostic process when a brake rotor is warped, in accordance with some embodiments of the present disclosure.

FIG. 6 shows example waveforms during a brake rotor diagnostic process when a brake rotor is warped, in accordance with some embodiments of the present disclosure. As shown in waveform 600, when a brake rotor (e.g., the brake rotor 106) is warped, surface deviation 602 (e.g., with respect to the brake pads 206) does vary as the brake rotor rotates, thereby inducing a feedback current in the electronic actuator (e.g., the electronic actuator 204). Thus, as shown in waveform 601, during constant braking, a determined operating parameter of the electronic actuator will vary (e.g., not be constant as shown in FIG. 5). For example, if the electronic actuator 204 comprises an electric motor (e.g., electric motor 302 of FIG. 3), a feedback current 604 of the electric motor will not be constant (e.g., after an initial turn-on time from time $t_0$-$t_1$) during constant braking. That is, the feedback current 604 of the electric motor will not correspond to the driving current of the electric motor (e.g., based on the desired braking power). By determining the variation in the feedback current 604, the warpage amount of the brake rotor may be determined (e.g., based on the rotor speed and the variation with respect to time).

Although constant braking is illustrated and described, it should be understood that the brake rotor diagnostic process may be performed when braking is not constant. For example, although, as the brake pedal is adjusted, the feedback current may vary, this feedback current may be filtered out to determine the variation of the feedback current due to brake rotor warpage and not based on brake pedal input. Additionally, although only a feedback current is shown, it should be understood that other feedback operating parameters may behave similarly. For example, back EMF voltage of a variable force solenoid will vary during constant braking if the brake rotor is warped.

Figure 7:
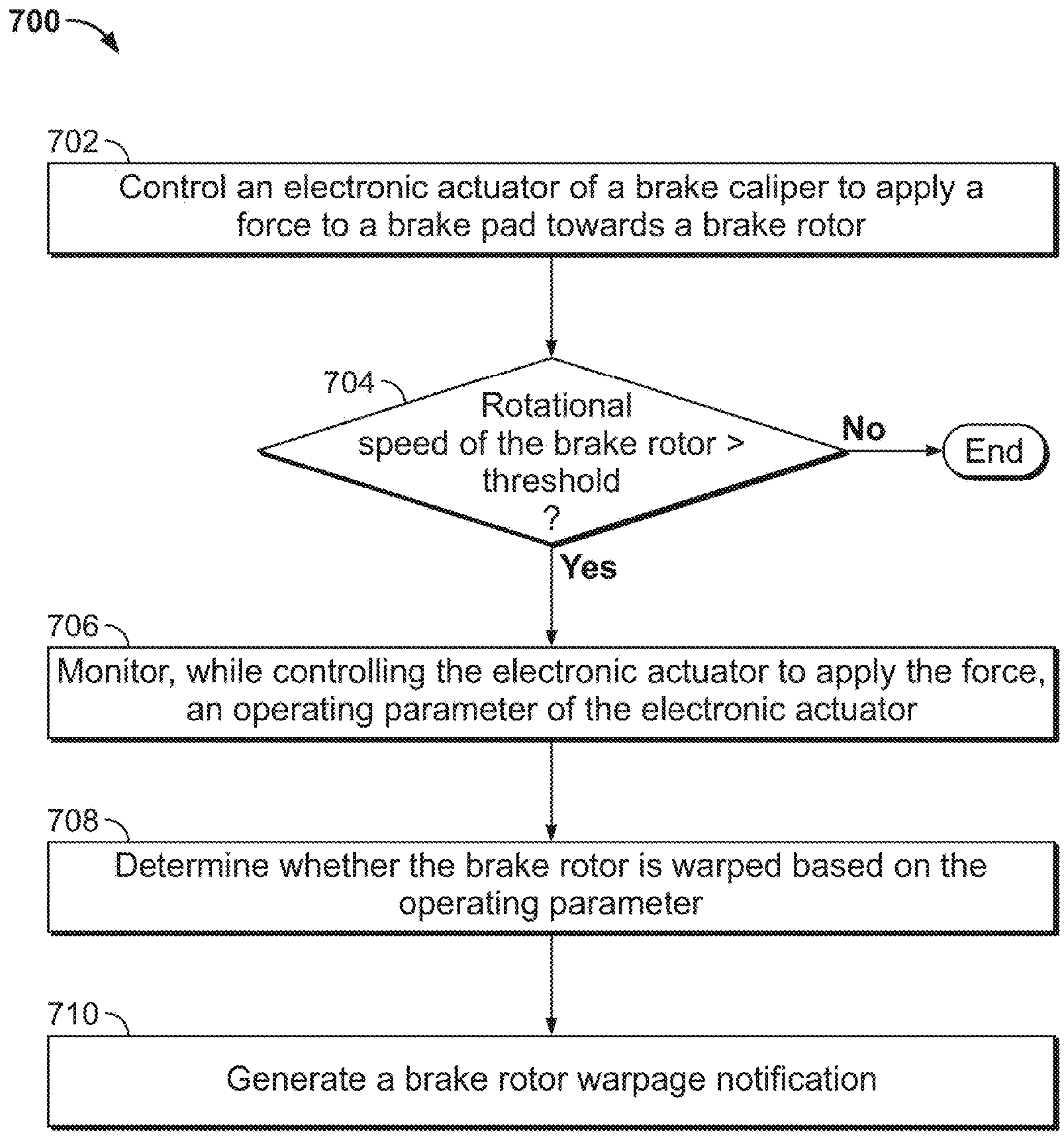
FIG. 7 shows a flowchart of an illustrative process for determining whether a brake rotor is warped, in accordance with some embodiments of the present disclosure.

FIG. 7 shows a flowchart of an illustrative process 700 for determining whether a brake rotor is warped, in accordance with some embodiments of the present disclosure. Process 700 (e.g., a brake rotor diagnostic process) may be performed at least in part by the control circuitry 208.

At 702, the control circuitry 208 controls the electronic actuator 204 to apply a force to a brake pad (e.g., the brake pad 206*a*) towards the brake rotor 106. Although only a single brake rotor is discussed, it should be understood that the process 700 may be performed for each brake rotor of the vehicle 100. For example, based on the position of the brake pedal 103, the control circuitry 208 may generate a deceleration request, translate the deceleration request to a brake torque request, and control the electronic actuator driver 218 to drive the electronic actuator 204 to achieve the desired deceleration. In some embodiments, the control circuitry 208 may initiate a service routine to provide a constant brake force (e.g., to improve the accuracy of the brake rotor diagnostic process). For example, the control circuitry 208 may control the electronic actuator 204 to apply a constant minimum force (e.g., constant braking) by filtering out small movements of the position of the brake pedal 103 over at least a predetermined amount of time. In some embodiments, because the control circuitry 208 may perform the process 700 when braking is not constant (e.g., by accounting for variation in feedback current due to non-constant braking), the control circuitry 208 may not modify a driver input to provide a constant brake force.

At 704, the control circuitry 208 determines if the rotational speed of the brake rotor 106 is above a threshold speed (e.g., based on information from the wheel speed sensor 216). In response to determining that the rotational speed of the brake rotor 106 is greater than a threshold speed ("Yes" at 704), the process 700 proceeds to 706. Otherwise ("No" at 704), the process 700 ends. In some embodiments, the control circuitry 208 may also end the process 700 based on other conditions that may affect the accuracy of the brake rotor warpage determination. For example, in order to accurately determine if the brake rotor 106 is warped, some minimum braking force must be applied to the brake rotor 106 (e.g., by the electronic actuator 204) for at least some minimum amount of time. Thus, if the applied brake force is below a minimum force, if anti-lock braking is engaged, or if the brake force is applied for below a minimum time, the process 700 may also end.

At 706, the control circuitry 208 monitors, while controlling the electronic actuator 204 to apply the force, an operating parameter of the electronic actuator 204. For example, as explained above, the monitored operating parameter may depend on the type of the electronic actuator 204. For example, if the electronic actuator 204 comprises an electric motor (e.g., the electric motor 302 of FIG. 3), the control circuitry 208 may monitor (e.g., by the electronic actuator sensor 214) the current of the electric motor. Similarly, if the electronic actuator 204 comprises a variable force solenoid (e.g., the variable force solenoid 400 of FIG. 4), the control circuitry 208 may monitor (e.g., by the electronic actuator sensor 214) the current and voltage (e.g., back EMF voltage) of the variable force solenoid. In some embodiments, the control circuitry 208 may additionally monitor the position information of the electronic actuator 204 (e.g., by the sensor 310 of FIG. 3 or the sensor 410 of FIG. 4).

At 708, the control circuitry 208 determines whether the brake rotor 106 is warped based on the operating parameter. For example, the control circuitry 208 may determine that the brake rotor 106 is warped by determining that the operating parameter changes more than a threshold amount within a predetermined time period (e.g., due to the induced current or back EMF voltage caused by the lateral-induced motion during rotation of a warped brake rotor). The change of the operating parameter within a predetermined time period may be determined in any suitable manner. For example, a difference between the maximum and minimum values of the operating parameter may be compared to a threshold, a standard deviation calculation of the operating parameter over a period of time may be determined, a derivative of the operating parameter may be determined, etc. Additionally, because the amount of variation may be a function of the rotor speed, the determined variation and threshold amount may be adjusted as a function of the current rotor speed (e.g., to accurately determine the amount of warpage of the brake rotor 106). In some embodiments, the control circuitry 208 may discard (e.g., filter out) a beginning portion (e.g., a buffer time period) of the operating parameter after controlling the electronic actuator 204 to apply the force to the brake pad 206. In some embodiments, the control circuitry 208 may determine the buffer time period based on at least one of the rotational speed of the brake rotor 106, a time since last controlling the electronic actuator 204 to apply a force, or a turn-on resistance of the electronic actuator 204 (e.g., to avoid variations in the operating parameter that are not caused by brake warpage).

In some embodiments, the control circuitry 208 may consider other variables when determining whether the brake rotor 106 is warped. For example, the determination may be verified or improved by filtering, modifying, or confirming a brake rotor warpage determination based on the monitored position information of the electronic actuator 204, accelerometer data from the vehicle 100 (e.g., during braking and non-braking periods), etc. In one embodiment, the warpage of the brake rotor 106 may be independently determined based on the position information of the electronic actuator 204 (e.g., by the sensor 310 of FIG. 3 or the sensor 410 of FIG. 4) and compared with the brake rotor warpage determined based on the operating parameter, as described above.

At 710, the control circuitry 208 generates a brake rotor warpage notification. In some embodiments, if the brake rotor is warped, the brake rotor warpage notification may be displayed on a vehicle display (e.g., on the display 110). In some embodiments, the brake rotor warpage notification may be sent to a remote vehicle manager. For example, if the vehicle 100 is part of a fleet, the brake rotor warpage notification may be sent to the fleet manager (e.g., using communication circuitry 220). However, this is only one example, and the brake rotor warpage notification may be sent to any suitable recipient.

The processes discussed above are intended to be illustrative and not limiting. One skilled in the art would appreciate that the steps of the processes discussed herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. An electromechanical braking system, comprising:
a brake caliper comprising an electronic actuator; and
control circuitry configured to:
control the electronic actuator to apply a force to a brake pad towards a brake rotor;
monitor, while controlling the electronic actuator to apply the force, an electrical operating parameter of the electronic actuator; and
determine whether the brake rotor is warped based on the electrical operating parameter.

2. The electromechanical braking system of claim 1, wherein:
the electronic actuator comprises an electric motor; and
the electrical operating parameter comprises a current of the electric motor.

3. The electromechanical braking system of claim 1, wherein:
the electronic actuator comprises an electric motor;
the electric motor is coupled to the brake pad through a mechanical linear actuator; and
the electrical operating parameter comprises a current of the electric motor.

4. The electromechanical braking system of claim 1, wherein:
the electronic actuator comprises a variable force solenoid; and
the electrical operating parameter comprises at least one of a back voltage of the variable force solenoid or a current of the variable force solenoid.

5. The electromechanical braking system of claim 1, wherein the control circuitry is configured to determine whether the brake rotor is warped based on a variation in the electrical operating parameter.

6. The electromechanical braking system of claim 1, wherein the control circuitry is configured to determine whether the brake rotor is warped by:
determining whether the electrical operating parameter changes more than a threshold amount within a time period; and
in response to determining that the electrical operating parameter changes more than the threshold amount within the time period, determining that the brake rotor is warped.

7. The electromechanical braking system of claim 1, wherein the control circuitry is further configured to generate a notification that the brake rotor is warped, in response to determining that the brake rotor is warped.

8. The electromechanical braking system of claim 1, wherein the control circuitry is configured to monitor the electrical operating parameter in response to
determining that a rotational speed of the brake rotor is above a threshold speed.

9. The electromechanical braking system of claim 1, wherein the control circuitry is configured to determine whether the brake rotor is warped by:
determining a buffer time period after controlling the electronic actuator to apply the force to the brake pad; and
determining whether the brake rotor is warped based on the monitored electrical operating parameter after the buffer time period.

10. The electromechanical braking system of claim 9, wherein the control circuitry is configured to determine the buffer time period based on at least one of a rotational speed of the brake rotor, a time since last controlling the electronic actuator to apply a force, or a turn-on resistance of the electronic actuator.

11. A method, comprising:
controlling an electronic actuator of a brake caliper to apply a force to a brake pad towards a brake rotor;
monitoring, while controlling the electronic actuator to apply the force, an electrical operating parameter of the electronic actuator; and
determining whether the brake rotor is warped based on the electrical operating parameter.

12. The method of claim 11, wherein:
the electronic actuator comprises an electric motor;
the electric motor is coupled to the brake pad through a mechanical linear actuator; and
the electrical operating parameter comprises a current of the electric motor.

13. The method of claim 11, wherein:
the electronic actuator comprises a variable force solenoid; and
the electrical operating parameter comprises at least one of a back voltage of the variable force solenoid or a current of the variable force solenoid.

14. The method of claim 11, wherein determining whether the brake rotor is warped is based on a variation in the electrical operating parameter.

15. The method of claim 11, wherein determining whether the brake rotor is warped comprises:

determining whether the electrical operating parameter changes more than a threshold amount within a time period; and in response to determining that the electrical operating parameter changes more than the threshold amount within the time period, determining that the brake rotor is warped.

16. The method of claim 11, further comprising generating a notification that the brake rotor is warped, in response to determining that the brake rotor is warped.

17. The method of claim 11, wherein monitoring the electrical operating parameter is in response to:

determining that a rotational speed of the brake rotor is above a threshold speed.

18. A vehicle comprising:

a brake rotor;

a brake caliper comprising an electronic actuator; and control circuitry configured to:

control the electronic actuator to apply a force to a brake pad towards the brake rotor;

monitor, while controlling the electronic actuator to apply the force, an electrical operating parameter of the electronic actuator; and determine whether the brake rotor is warped based on the electrical operating parameter.

19. The vehicle of claim 18, wherein the control circuitry is configured to determine whether the brake rotor is warped by:

determining whether the electrical operating parameter changes more than a threshold amount within a time period; and in response to determining that the electrical operating parameter changes more than the threshold amount within the time period, determining that the brake rotor is warped.

20. The vehicle of claim 19, wherein the control circuitry is configured to filter the electrical operating parameter based on at least one of a rotational speed of the brake rotor, a time since last controlling the electronic actuator to apply a force, or a turn-on resistance of the electronic actuator.

* * * * *